July 23, 1929.  B. F. SCHMIDT  1,721,673
GEAR SHIFT MECHANISM
Filed Feb. 21, 1928   2 Sheets-Sheet 1
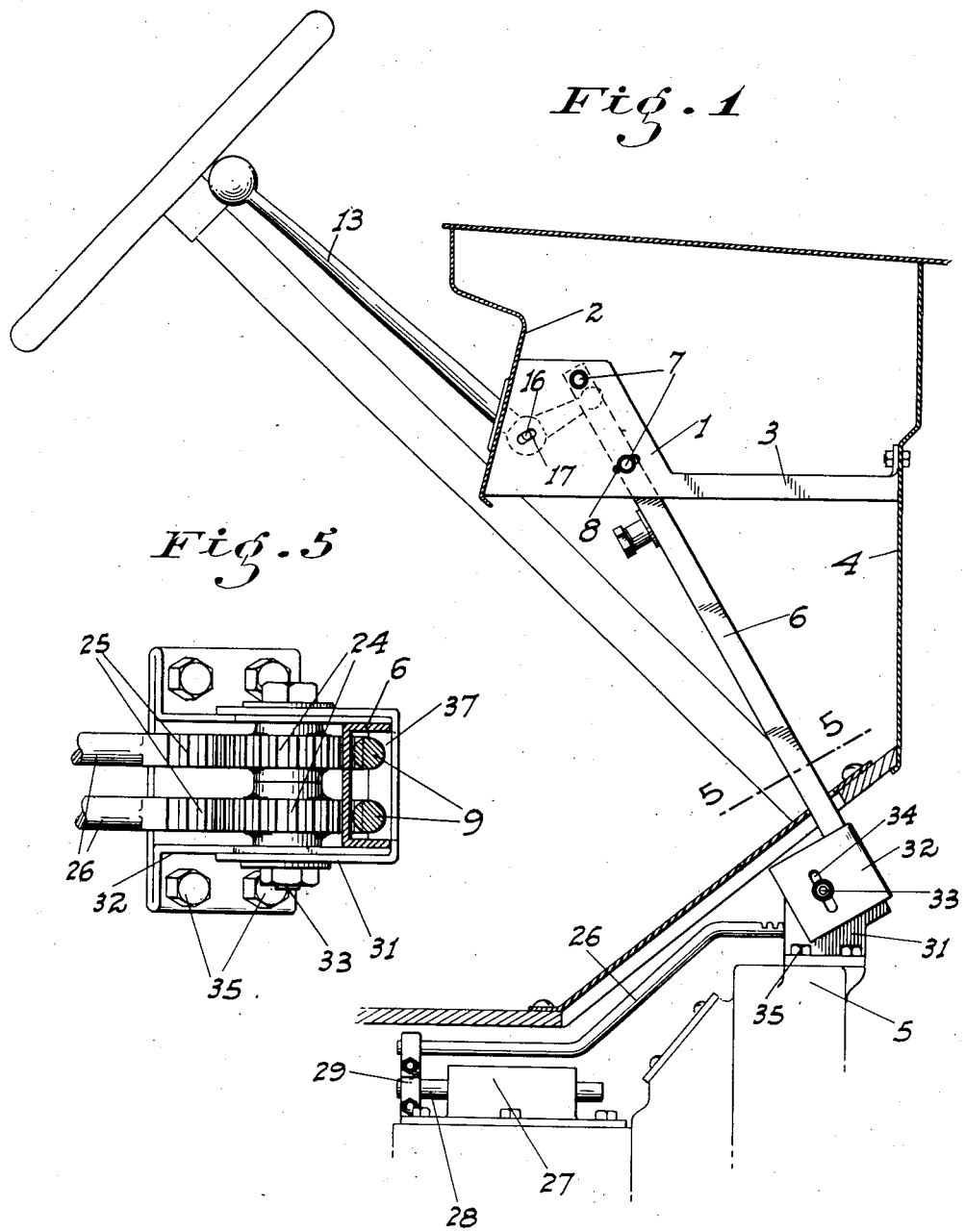
INVENTOR
B.F. Schmidt
BY 
ATTORNEY

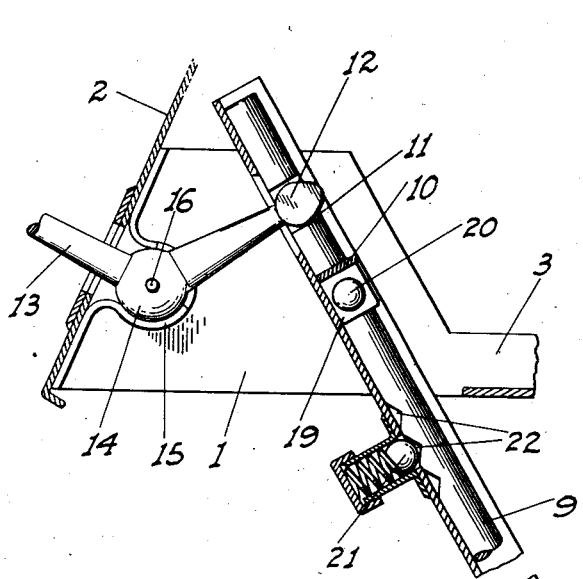
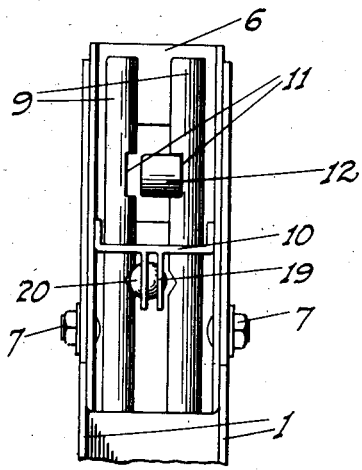
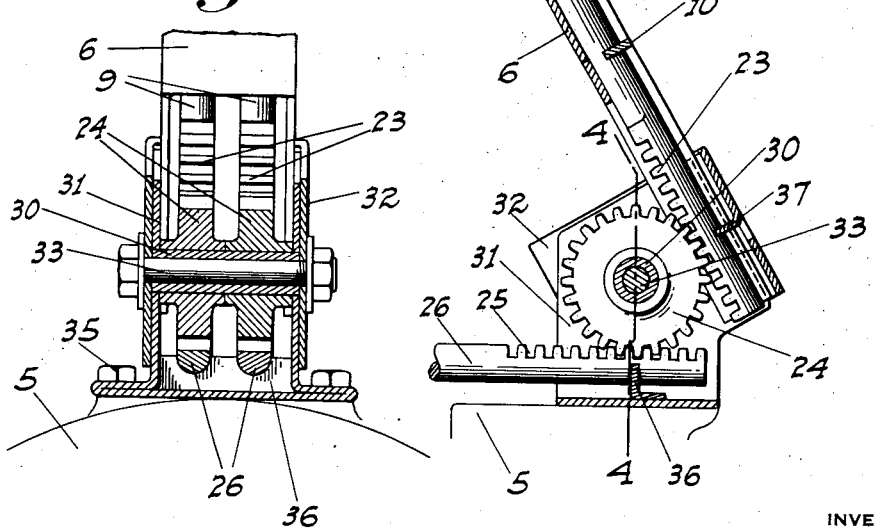

Patented July 23, 1929.

1,721,673

UNITED STATES PATENT OFFICE.

BENJAMIN F. SCHMIDT, OF LOS ANGELES, CALIFORNIA.

GEAR-SHIFT MECHANISM.

Application filed February 21, 1928. Serial No. 255,909.

This invention relates to gear shift mechanism for motor vehicles of that type which are controlled by a lever mounted on the dash board of the vehicle and such as is shown in my co-pending applications for patent, Serial No. 209,230, filed July 29, 1927; Serial No. 242,670, filed December 27, 1927; and others.

The principal object of my present invention is to provide a shift mechanism of this general character so constructed that problems of assembly of the mechanism in the vehicle, with regard to variations in the distance between the dashboard, the flywheel housing of the invention, and other parts between which my mechanism extends, may be more readily taken care of, without alterations in the mechanism being necessary, than was possible with the previous devices.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved gear shift mechanism as mounted on a motor vehicle.

Fig. 2 is an enlarged fragmentary sectional elevation of the structure.

Fig. 3 is a fragmentary front end elevation of the upper portion of the mechanism.

Fig. 4 is a cross section on the line 4—4 of Fig. 2.

Fig. 5 is a fragmentary plan section on the line 5—5 of Fig. 1.

Referring now more particularly to the characters of reference on the drawings, the numeral 1 denotes a bracket consisting of a pair of transversely spaced plates secured to the dashboard 2 of the vehicle in vertical and parallel relation to each other in front of the dashboard and having a forward extension 3 which projects to the bulkhead 4 of the engine compartment and is secured thereto in any suitable manner.

Disposed between the plates 1 and extending downwardly at a forward angle to a point below the floor and just above the flywheel housing 5 of the power plant of the vehicle is a channel shaped rod housing 6. This housing is secured to the plates 1 by vertically spaced bolts 7, the lower ones of which are adjustable through longitudinal slots 8 cut in said plates, so that the housing may be swung in a fore and aft direction somewhat to thus alter the longitudinal setting of the lower end of the housing to suit different settings of flywheel housing relative to the dashboard. The housing 6 has a pair of transversely spaced rods 9 slidable therein, which rest on the bottom of the channel (which is at the rear) and are guided by plates 10 depending at intervals into the housing from the forward edge thereof. Adjacent their upper ends, the rods are notched as at 11 on their adjacent faces to selectively receive the free and inner end 12 of the shifting lever 13. This lever projects rearwardly from the dashboard and has a ball 14 formed therewith intermediate its ends which is swivelly mounted in a socket 15 provided with and between the plates 1. This ball has a transverse pin 16 which works in a slot 17 provided in the plates and which is disposed so as to allow only of the swivel movement of the lever in certain necessary directions. The uppermost guide plate 10 has extensions 19 extending parallel to and between the rods, to support a neutral interlock ball 20; while the bottom of the housing 6 has a spring pressed ball 21 for each rod, adapted to engage notches 22 provided in longitudinally spaced relation in the adjacent faces of the rods.

At their lower ends the rods are provided with rack teeth 23 which engage the forward faces of individually turnable gears 24. The under faces of these gears engage teeth 25 formed on horizontal rods 26 which extend rearwardly and longitudinally of the vehicle over the transmission housing 27, and at their rear ends are secured to the rear ends of the shifting rods 28 of the transmission by rigid couplings 29 of suitable character.

The gears are turnably mounted on a sleeve 30 which projects through the side plates of a bracket 31 which is bolted on top of the flywheel housing. Secured to and straddling the lower end of the housing 6 is a bracket whose side plates 32 overhang the sides of the bracket 31. The sleeve 30 extends to but not through the plates 32 and a bolt 33 passes through the sleeve and the plates 32 and clamps on said plates and sleeve rigidly together as a unit. To allow for both longitudinal and vertical adjustment of the housing bracket 32 relative to the bracket 31, the bolt hole in the plates 32 is in the form of a slot 34 which is disposed with a fore and aft slant or parallel to the housing 6. The holes in the bottom of the bracket 31 for its holding bolts 35 are also longitudinally slotted so as to enable the longitudinal setting of said bracket, and consequently of the gears, to be altered as may be necessary to suit different conditions. It will therefore be seen that by reason of the various adjustments provided for the setting of the parts of the shifting mechanism relative to each other, it is possible to properly set them on to a vehicle regardless of minor variations in distance between the body and the engine or chassis parts on which said mechanism is mounted. The bracket 31 is provided with a guide plate 36 to keep the teeth of the rods 26 in proper mesh with the gears, and the bracket 32 likewise has a guide plate 37 to engage the rods 9 and maintain their teeth in proper mesh with said gears. These plates may be made adjustable toward the gear if desired, so that they may be held firmly against the rod regardless of any wear developing Owing to the positioning of the two sets of rods relative to the gears, said gears may be kept very small, since as one upper rod moves in one direction, the corresponding horizontal or lower rod will move in the opposite direction, so that the adjacent ends of the rods never interfere with each other during any longitudinal movement thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear shift mechanism for a motor vehicle including gears, a bracket for said gears mounted on the power-plant housing ahead of the transmission mechanism, rods having rack teeth engaging said gears and extending rearwardly thence to connections with the shift-rods of the transmission mechanism, substantially vertical rods having teeth engaging the gears, and a shift lever for selective engagement with the last named rods adjacent their upper ends.

2. A structure as in claim 1, with a support and guide structure for said last named rods, and a common support for the lever and for the upper end of said rod support.

3. A gear shift mechanism for a motor vehicle including gears, a bracket for said gears mounted on the power-plant housing ahead of the transmission mechanism, rods having rack teeth engaging said gears and extending rearwardly thence to connections with the shift-rods of the transmission mechanism, substantially vertical rods having teeth engaging the gears, a housing and support for the last named rods, adjustable connecting means between the housing and the gear bracket, a support for the upper ends of said housing, and a lever arranged for selective engagement with the rods, mounted on said support.

4. A gear shift mechanism for a motor vehicle including gears, a bracket for said gears mounted on the power-plant housing ahead of the transmission mechanism, rods having rack teeth engaging said gears and extending rearwardly thence to connections with the shift-rods of the transmission mechanism, substantially vertical rods having teeth engaging the gears, a housing and support for the last named rods, a bracket secured to the lower end of the housing engaging the gear bracket and adjustable vertically relative thereto, means for clamping said brackets together in a predetermined fixed position, a support at the upper end of the rod-housing, means adjustably securing said support and housing together, and a lever mounted in said support for selective engagement with the rods.

5. A gear shift mechanism for a motor vehicle comprising a pair of transversely spaced gears, a sleeve on which said gears are independently turnable, a bracket for supporting the sleeve from the power plant housing ahead of the transmission and including side plates, rods having rack-teeth thereon engaging the gears and extending rearwardly thence to connections with the shift rods of the transmission mechanism, other rods having teeth engaging the gears and extending thence upwardly, means for selectively moving said rods longitudinally, a housing and guide structure for said rods, a support for the upper end of the housing, a bracket secured to the lower end of the housing and including side plates overlapping the plates of the gear-bracket, and a clamping bolt through the sleeve and housing-bracket plates; the opening for the bolt in said plates being in the form of a slot disposed at an acute angle to a vertical plane.

6. A gear shift mechanism for a motor vehicle including gears, a bracket for said gears mounted on the power-plant housing ahead of the transmission mechanism, rods having rack teeth engaging said gears on the under side thereof and extending rearwardly thence to connections with the shift-rods of the transmission mechanism, substantialy vertical rods having teeth engaging the gears on the forward side thereof, a shift lever for selective engagement with the vertical rods adjacent their upper ends.

In testimony whereof I affix my signature.

BENJAMIN F. SCHMIDT.